Oct. 22, 1957

A. C. ELD ET AL 2,810,562

FRUSTO-CONICAL FRACTIONATION TRAY HAVING
PERFORATED AND NON-PERFORATED SECTIONS

Filed Nov. 28, 1952

INVENTORS
JOHN R. GUALA
AKSEL C. ELD
BY
Horace S. Cooke
ATTORNEY though a portion of apparatus incorporating the present invention;

United States Patent Office 2,810,562
Patented Oct. 22, 1957

2,810,562

FRUSTO-CONICAL FRACTIONATION TRAY HAVING PERFORATED AND NON-PERFORATED SECTIONS

Aksel C. Eld, Pittsburgh, Pa., and John R. Guala, Wilmington, Del., assignors to Gulf Oil Corporation, Pittsburgh, Pa., a corporation of Pennsylvania Application November 28, 1952, Serial No. 323,054

5 Claims. (Cl. 261—114)

This invention relates to new and useful improvements in apparatus for the countercurrent contacting of fluid phases of differing densities, such as used in fractionation, absorption, and extraction processes, and more particularly pertains to improvements in apparatus of such character employing perforated frusto-conical sections.

Heretofore, phase contacting apparatus of the type utilizing a vertical series of alternated upright and inverted frusto-conical trays having weir means between their adjacent ends have included at least two or more such series arranged in side by side relation and have not included any provision whatsoever to prevent the less dense phase travelling through the apparatus from passing disproportionately through trays of the various series.

It is of course essential to efficient operation of such apparatus that the ratio of the quantity of descending dense phase material to the quantity of ascending less dense phase material be uniform throughout the apparatus at each horizontal level. However, in prior apparatus, such ratios in the various vertical series of trays are subject to being unequal or variable in actual operations, as a result of numerous factors such as temperature gradients in the apparatus caused by the physical environment of the apparatus, minor mechanical imperfections and inequalities among the trays that affect fluid flow, and the lack of symmetry of vertical series of trays with respect to the apparatus shell and the effects thereof on fluid flow. As a consequence of these and other factors, the most efficient and desired mode of operation is subject to being difficult of realization in the use of previously known apparatus. With such inefficient operation, it is necessary to extend the vertical extent of the apparatus to achieve the same degree of separation that would otherwise be possible.

Therefore, the primary aim of this invention is to obviate the aforesaid difficulty whereby channeling of the less dense phase may be avoided, and increased contacting efficiency be thereby obtained for a given number of superimposed trays.

A desideratum of this invention is to provide apparatus that in each contacting stage will disperse the denser phase into a discontinuous phase in the form of droplets or mist in the continuous less dense phase.

Still another object of this invention in accordance with the above-stated desideratum, is to enable increasing the rate of descent of the dispersed denser phase material in the apparatus by affording relatively quiescent zones above collecting sumps to permit rapid settling of mist and droplets.

It is also an object of this invention to reduce or eliminate entirely the clogging of sumps by particulate solids contained in or that may be formed in the materials undergoing treatment in the apparatus.

The present invention attains the above-mentioned objectives, and is described hereinafter in connection with the accompanying drawings, wherein.

Figure 1:
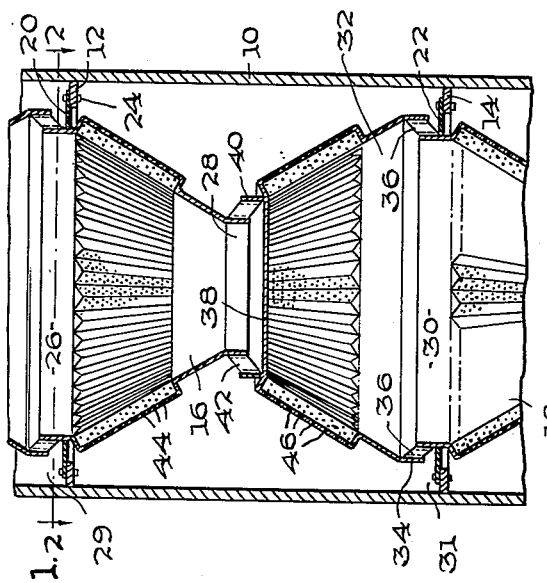
Figure 1 is a central vertical sectional view through a portion of apparatus incorporating the present invention.
Figure 2:
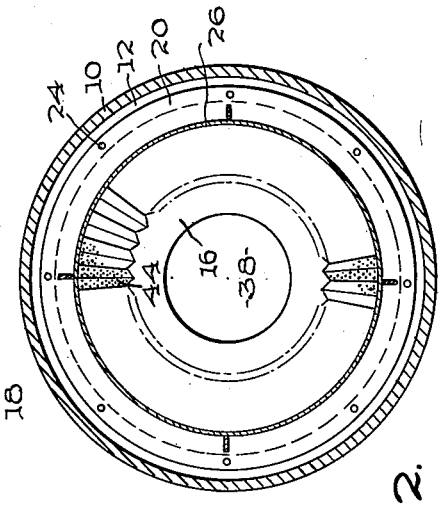
Figure 2 is a horizontal sectional view taken upon the plane of broken section line 2—2 in Figure 1.

Reference is now made to the drawings, and specifically to the form of the invention illustrated in Figures 1 and 2, wherein the numeral 10 designates an upstanding hollow shell to the interior of which a pair of horizontally disposed, vertically spaced angular flanges 12 and 14 are secured, as by welding or the like.

A pair of vertically spaced, generally frusto-conical trays 16 and 18 are disposed within the shell 10 and are supported in coaxial relation therewith by means of outwardly extending flanges 20 and 22 that overlie and are bolted to the flanges 12 and 14, respectively. For reasons to become subsequently apparent, the flanges 12 and 20 are secured together by bolts 24 in liquid-tight sealing engagement. The openings in the overlapping flanges 12 and 20, through which the bolts 24 extend, may be slotted to a sufficient extent to allow for different degrees of thermal expansion in the apparatus. The flanges 14 and 22 are secured together in a manner analogous to the manner in which the flanges 12 and 20 are secured.

While the tray 16 has been described as being substantially frusto-conical, it will be seen upon inspection of Figure 1 that while the same is frusto-conical for the major portion of its vertical extent the upper or larger portion thereof is preferably cylindrical, as shown at 26, and extends above the flange 20, while the lower, or minor end portion of the tray 16 terminates preferably in a cylindrical portion indicated at 28. The relation of the cylindrical portion 26 of the tray 16 to the shell 10 and the flanges 12 and 20 is such that a horizontally disposed, annular trough or liquid sump 29 is defined, which extends about the inner surface of the shell 10, and from which trough 29 liquid will overflow above the upper edge of the cylindrical portion 26 of the tray 16 into such tray. The tray 18, which may be substantially identical to tray 16, also includes an upper cylindrical portion 30 that extends above the flanges 14 and 22 associated with tray 18, so that a trough 31 similar to trough 29 is defined from which liquid will overflow the cylindrical portion 30 into the tray 18.

A substantially frusto-conical tray 32 having its minor or smaller end uppermost is disposed between the trays 16 and 18 and is in coaxial relation therewith. The tray 32 preferably includes a lower cylindrical portion 34 that is disposed in spaced relation within the trough 31. The adjacent ends of the trays 18 and 32 are maintained in fixed relation with respect to each other by means of circumferentially spaced connecting means 36 connecting the cylindrical portions 30 and 34.

The upper end of the tray 32 is closed by an imperforate end wall 38, which end wall 38 is provided about its periphery with an upstanding side wall 40 to define jointly a shallow pan or liquid sump. The cylindrical portion 28 is received in spaced relation within the pan defined by the walls 38 and 40. The trays 16 and 32 are preferably retained in fixed relation by means of circumferentially spaced connecting means 42 suitably securing the cylindrical portion 28 and the wall 40.

The tray 16, from a position below the flange 20, is provided with a multiplicity of perforations 44 which have as a horizontal lower limit a position intermediate the vertical extent of the tapered or frusto-conical portion of the tray 16, as clearly shown in Figure 1. Similarly, the tray 32 is provided with a multiplicity of perforations 46 which extend from below the end wall 38 to a horizontal limit intermediate the vertical extent of the frusto-conical or tapered portion of the tray 32. It will thus be seen that only the upper portion of the frusto-conical or tapered portion of each of the trays 16 and 32 is perforated, while the lower tapered portion of each of such trays is imperforate.

While the portions of the trays 16 and 32 which are perforate may be strictly frusto-conical, the preferred construction of such trays involves the perforated portions thereof being corrugated in the manner shown in Figure 1. Alternatively, the corrugations may be so arranged that the valleys and ridges thereof encircle the rays rather than extend vertically along the sides thereof. Thus, as shown in Figure 1, the upper portion of each of the trays is corrugated and perforated throughout slightly more than the major extent of the tapered portion, with the remaining portion being smooth walled.

Figure 3:
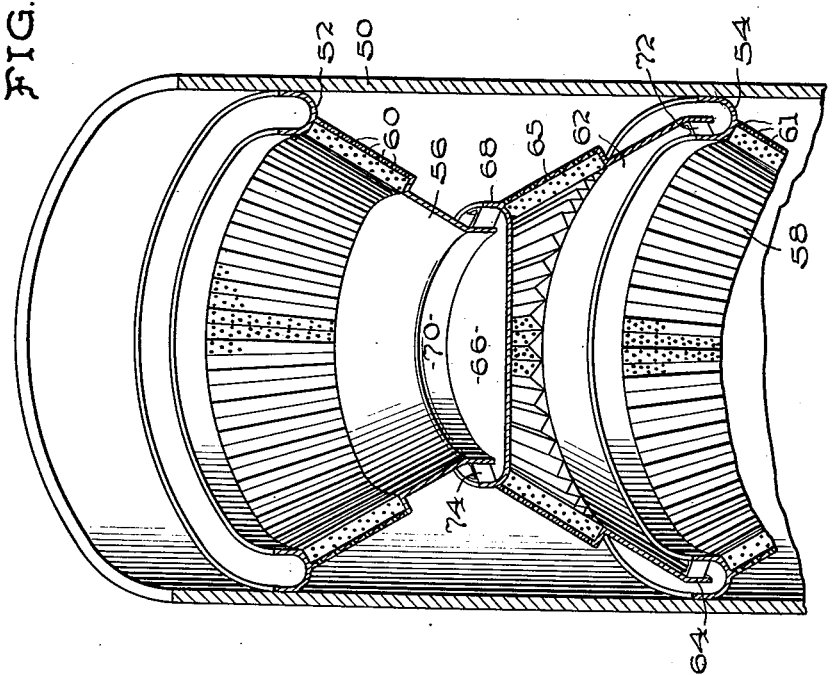
Figure 3 is a central vertical section, shown in perspective, of a portion of apparatus incorporating a modified form of the invention.

Attention is now directed to the form of the invention illustrated in Figure 3, wherein the outer shell is designated at 50. Fixedly secured to the inner surface of the shell 50, as by welding or the like, is a pair of vertically spaced, horizontally disposed annular troughs or sumps 52 and 54, each of which have their inner surfaces transversely concaved for a purpose to subsequently become apparent. Fixedly secured, as by welding or the like, to the troughs 52 and 54 is a pair of generally frusto-conical hollow trays 56 and 58. The trays 56 and 58 have their major or larger ends uppermost and are secured at their upper edges to the troughs 52 and 54 in such a manner that liquid overflow from such troughs will pass into the trays.

The upper portion of the vertical extent of the downwardly tapered portion of each of the trays 56 and 58 are perforate, as at 60 and 61 respectively and preferably, as in the case of the previously-described trays 16 and 32, are corrugated throughout the vertical extent of the perforations 60 and 61.

Interposed between the trays 56 and 58 is a further substantially frusto-conical, hollow tray 62, the major or larger end of which is lowermost and formed with a depending cylindrical portion 64 that depends in spaced relation in the trough 54. Like trays 56 and 58, tray 62 is perforated and corrugated, as at 65, in the upper portion of the tapered extent thereof. The upper end of the tray 62 is closed by a shallow pan 66 that includes gently upwardly and outwardly flaring sides 68. Received in spaced relation within the pan 66 is a depending cylindrical portion 70 formed at the lower end of the tray 56.

Circumferentially spaced braces or connecting means 72 interconnect the trough 54 and the cylindrical portion 64 of the tray 62 to maintain these components in fixed spatial relation, and similarly, connecting means 74 maintain the pan 66 and the cylindrical portion 70 in fixed spatial relation.

Before proceeding with the description of the operation of the invention, it should be understood in connection with each of the forms of invention illustrated, that only a portion of the apparatus is shown, and that in each instance there is involved a vertical series of alternately inverted and upright frusto-conical trays such as those illustrated. In other words, in the first form of the invention described, the tray 18 is substantially identical to the tray 16 and, as will be appreciated, is underlain by a further tray that corresponds to the tray 32, etc. In an analogous manner, the form of the invention illustrated in Figure 3 should be understood to include a tray similar to tray 62 disposed above the tray 56 and a similar one disposed below the tray 58, etc.

The operation of the invention is substantially identical for each of the described forms thereof, and will be first described in connection with the form of the invention illustrated in Figures 1 and 2.

In the use of the invention for the purpose of fractionation, such as of petroleum components, it will be assumed that in operation the trough 29 is continuously filled and overflowing with liquid, while vapors are passing upwardly through the cylindrical portion 30 of the tray 18. In addition, trough 31 is also filled and overflowing with liquid, as is the pan defined by the walls 38 and 40. Under such circumstances, it will be seen that by virtue of the cylindrical portions 28 and 34 depending within the pan defined by walls 38 and 40 and the trough 31 respectively, the vapors passing upwardly through the cylindrical portion 30 must continue their upward course through the shell 10 along a path that first enters the interior of the tray 32 thence passing outwardly through the perforations 46 into the space surrounding the trays 16 and 32, thence passing into the tray 16 through the perforations 44 to subsequently pass upwardly through the cylindrical portion 26 of the tray 16. The liquid overflowing the upper edge of the cylindrical portion 26 passes downwardly over the inner perforated surface of the tray 16 to contact vapor passing inwardly through the perforations 44. In the preferred mode of operation, the vapors passing through the perforations 44 contact the liquid flowing over the inner surface of the tray 16 in a manner analogous to the liquid-vapor form of contact obtained in the operation of the perforated corrugated trays illustrated and described in U. S. Patent No. 2,591,343, issued to Aksel C. Eld, April 1, 1952, that is, the ascending vapors sweep the descending liquid into the interior of the tray 16 in the form of droplets or mist thereby achieving an extremely intimate contact between the discontinuous liquid phase thus obtained and the continuous vapor phase.

Within the tray 16 the liquid carried by the vapor in the form of mist or droplets tend to settle out and drop into the pan defined by the walls 38 and 40. It is extremely important to note that as a consequence of the tray 16 being imperforate for a substantial portion of the vertical extent of the tapered portion thereof, a relatively quiescent zone is afforded within the lower portion of the tray 16 which greatly facilitates the settling of the dispersed liquid phase within the tray 16. By quiescent zone is meant a zone comparatively free from rising vapor currents. It will thus be seen by such construction, not only is an extremely intimate contact between the phases obtained so as to achieve a very rapid approach to vapor-liquid equilibrium, but in addition, for a given size apparatus, high rates of downward liquid flow and upward vapor flow may be realized without an objectionable amount of liquid entrainment from tray to tray.

Liquid settles from within the quiescent zone of tray 16 into the sump or pan defined by walls 38 and 40 and then overflows the upper edge of the wall 40 to pass downwardly upon the outer perforated surface of the tray 32. Liquid passing downwardly over the tray 32 passes in contact with vapor that is passing outwardly from the tray 32 through the perforations 46. The type of liquid-vapor contact afforded in this instance is of a similar character to that previously described in connection with tray 16, so that the liquid is swept outwardly from the surface of the tray 32 in the form of a suspended mist or droplets in the space surrounding the trays 16 and 32. The settling of the suspended dispersed phase of liquid from vapor surrounding the trays 16 and 32 is greatly facilitated by virtue of the lower tapered portion of the tray 32 being imperforate, inasmuch as a relatively quiescent zone is afforded surrounding the imperforate portion of the tray 32. Liquid settling from the quiescent zone surrounding the trays 16 and 32 is collected within the trough 31 where the same continuously overflows to pass into tray 18.

While each of the trays 16 and 32 are shown with somewhat in excess of the lower ⅓ of the vertical tapered extent thereof being imperforate, the proportion of imperforate to perforate portions of the tapered extent of each of these trays may obviously be varied considerably while still obtaining the benefit of the quiescent zones, and such proportion will normally be dependent upon and adjusted to suit the particular problem at hand, namely the relative rates of vapor and liquid flow desired or necessary in the separating process.

The operation of the form of the invention shown in Figure 3 is identical to the above-described operation of the form of the invention shown in Figures 1 and 2, except that use of the form of apparatus shown in Figure 3 may be more desirable in connection with separation processes wherein solid particulate matter, such as catalyst is carried into the apparatus, or solid particulate matter is formed by decomposition or reaction within the materials that are being treated themselves, as by coking or the like. Obviously, when solid particulate matter exists within the apparatus, the same will tend to gravitate downwardly through the apparatus to be eventually retained in one of the liquid sumps. It will be evident that with the accumulation of solid particulate matter in the sumps, the operation of the apparatus is seriously impaired and the same may become so clogged as to be essentially inoperative, thereby necessitating an expensive shut down and cleaning operation.

In the form of the invention shown in Figure 3 the retention of solid particulate matter in the liquid sumps is obviated entirely or at least greatly lessened by virtue of certain details of the construction thereof, namely, the shape of the troughs 52 and 54, and the pan 66. A self-scouring action is obtained by the liquid passing over the troughs 52 and 54, and the pan 66. An understanding of such self-scouring action may be had upon observing the relation of the cylindrical portion 64 of the tray 62 to the transversely curved trough 54 whereby it will be obvious that liquid settling into the trough 54 must necessarily pass below the lower edge of the cylindrical portion 64 in close proximity to the smoothly concaved inner surface of the trough 54 and thence upwardly to overflow the inner edge thereof. By virtue of the inner surface of the trough 54 being smoothly curved it will be seen that liquid passing therethrough will tend to wash or scour solid particulate matter therefrom and wash the same down into the tray 58.

In a similar fashion, liquid descending into the pan 66 through the cylindrical portion 70 of the tray 56 must pass under the lower edge of the cylindrical portion 70 and thence upwardly over the smoothly curved sides 68 of the pan 66, whereby solid particulate matter tends to be swept from the pan 66. It will thus be seen that the transverse curvature of the inner surface of the troughs 52 and 54 prevents such a retention of solid particulate matter in such troughs that would otherwise be a consequence of the presence of such matter in the descending liquid stream if the inner surfaces of the troughs 52 and 54 were angular in character. The same function for the pan 66 is obtained by virtue of the same including the gently upwardly and outwardly curved walls 68.

Although each of the forms of the invention illustrated include shells of cylindrical form it will be evident that such shells need not necessarily be cylindrical throughout their entire vertical extent, and may, if desired, vary in diameter between various points throughout their heights, such variations in shell configuration being, of course accompanied by any necessary changes in tray dimensions to conform with the shell.

While it is very desirable that the shell and the structure contained therein shall each be circular in horizontal cross section, it is within the scope of this invention that the shell and the components therein may be in the shape of any regular polygon in horizontal cross section.

Notwithstanding the fact that the use of the invention has been described in connection with a fractionation process, it is thought that it will be evident to those skilled in the art that the apparatus is equally suitable for steam (or other vapor) stripping and liquid-liquid extraction processes, and absorption processes, or in fact, any countercurrent fluid contacting process. For example, in the operation of the apparatus in a liquid-liquid extraction process, the denser liquid would correspond to the previously-described operation of the liquid in the fractionation process and the lighter or less dense liquid would operate in an analogous manner to the vapor of the previously-described fractionating process.

The invention has been described in detail in the interest of conveying a full and complete understanding thereof, and reference should be made to the appended claims to ascertain the actual scope of the invention.

What we claim is:

1. In countercurrent fluid contacting apparatus, an upstanding hollow shell, means defining a vertically spaced pair of annular, hollow troughs positioned on the inner surface of the shell, a substantially frusto-conical, hollow tray coaxial with the shell and having its larger end portion uppermost and secured to the uppermost of said troughs to receive overflow therefrom, a second substantially frusto-conical, hollow tray coaxial with said shell and disposed below the first mentioned tray, said second tray having its larger end lowermost and received within the lowermost of said troughs, and a pan closing the upper end of said second tray and receiving the lower end of the first mentioned tray, with the upper portion of each of the trays being corrugated and perforated throughout slightly more than the major extent of its tapered portion and with the remaining tapered portion of each of the trays being smooth walled.

2. For use in countercurrent fluid contacting apparatus, a tray construction including a hollow body tapered about a central axis, and said body adjacent one end thereof and throughout slightly more than a major portion of its length being both corrugated and perforated, with the remaining portion of the body being smooth walled.

3. For use in countercurrent fluid contacting apparatus, a tray construction including a hollow body tapered about a central axis, said body adjacent one end thereof and throughout slightly more than a major portion of its length being both corrugated and provided with a multiplicity of axially and circumferentially spaced perforations, with the remaining portion of the body being smooth walled.

4. For use in countercurrent fluid contacting apparatus, an upstanding hollow shell of circular horizontal cross section, a sump in the shell, means defining an annular, horizontally disposed trough on the inner surface of the shell, said trough being spaced above and of greater diameter than the sump, and a generally frusto-conical, hollow tray having its larger end secured to the trough and its smaller end received in the sump, the upper portion of the tray being corrugated and perforated throughout slightly more than the major extent of its tapered portion, with the remaining portion being smooth walled.

5. For use in countercurrent fluid contacting apparatus, an upstanding hollow shell of circular horizontal cross section, a sump in the shell, a generally frusto-conical, hollow tray in the shell and having its larger end lowermost and received in the sump, a pan closing the upper end of the tray and so arranged as to overflow liquid onto the upper outer surface of the tray, the upper portion of said tray being corrugated and perforated throughout slightly more than the major extent of its tapered portion, with the remaining portion being smooth walled.

References Cited in the file of this patent

UNITED STATES PATENTS

| | | |
|---|---|---|
| 757,757 | Luhne | Apr. 19, 1904 |
| 999,213 | Durant | Aug. 1, 1911 |
| 1,480,888 | Marshall | Jan. 15, 1924 |
| 2,005,316 | Hall | June 18, 1935 |
| 2,051,545 | Collins | Aug. 18, 1936 |
| 2,105,501 | Parsons | Jan. 18, 1938 |
| 2,702,741 | Robertson | Feb. 22, 1955 |